United States Patent
Lee et al.

(10) Patent No.: US 12,063,301 B2
(45) Date of Patent: Aug. 13, 2024

(54) DEVICE FOR GENERATING DIGITAL RANDOM ENCRYPTION KEY

(71) Applicants: HYUNDAI MOTOR COMPANY, Seoul (KR); KIA CORPORATION, Seoul (KR)

(72) Inventors: Jisung Lee, Suwon-si (KR); Han Saem Lee, Seoul (KR); Su Jung Noh, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 348 days.

(21) Appl. No.: 17/568,159

(22) Filed: Jan. 4, 2022

(65) Prior Publication Data

US 2023/0006824 A1 Jan. 5, 2023

(30) Foreign Application Priority Data

Jun. 30, 2021 (KR) .................. 10-2021-0085678

(51) Int. Cl.
*H04L 9/12* (2006.01)
*H04L 9/08* (2006.01)

(52) U.S. Cl.
CPC .......... *H04L 9/0869* (2013.01); *H04L 9/0897* (2013.01); *H04L 9/12* (2013.01); *H04L 9/0872* (2013.01)

(58) Field of Classification Search
CPC ... H04L 9/0869; H04L 9/0872; H04L 9/0875; H04L 9/12; H04L 9/32

USPC .................. 709/203, 220, 224, 227, 228
See application file for complete search history.

(56) References Cited

U.S. PATENT DOCUMENTS

| 9,218,159 B2* | 12/2015 | Seol ...................... H04L 9/0869 |
| 9,886,571 B2* | 2/2018 | Caporale ................. G06F 21/85 |
| 10,069,928 B1* | 9/2018 | Hardy ..................... H04L 69/22 |
| 11,861,962 B1* | 1/2024 | Principato ........ G08B 13/19697 |
| 11,985,259 B2* | 5/2024 | Howard ................ H04L 9/0866 |

(Continued)

FOREIGN PATENT DOCUMENTS

| CA | 2479669 C * | 5/2012 | ............. G01S 1/026 |
| EP | 3208734 B1 * | 7/2020 | ............ B41J 2/1753 |

(Continued)

*Primary Examiner* — Khanh Q Dinh
(74) *Attorney, Agent, or Firm* — MCDONNELL BOEHNEN HULBERT & BERGHOFF LLP

(57) ABSTRACT

A device for generating a digital random encryption key includes an input unit adding a non-volatile active element for overcoming a limit of a passive element when generating an encryption key, applying a random passive filter, and inputting an analog voltage signal to an encryption key generator, an encryption key generator including a non-volatile active element and a passive filter, connected to the input unit through a connection substrate, and generating a random encryption key from an entropy source, and a converter for converting a signal generated by the encryption key generator into a digital signal and outputting the digital signal is provided, thereby improving robustness of security compared to the case of applying the general passive element, allowing regeneration or random generation, and generating an excellent encryption key working excellently for physical reverse engineering violations.

8 Claims, 6 Drawing Sheets

(56) References Cited

U.S. PATENT DOCUMENTS

| | | | |
|---|---|---|---|
| 11,997,212 B2* | 5/2024 | Liu | H04L 9/3247 |
| 11,997,217 B2* | 5/2024 | Szubbocsev | G06F 9/45558 |
| 2006/0250585 A1* | 11/2006 | Anderson | G03B 21/10 |
| | | | 353/79 |
| 2014/0037086 A1* | 2/2014 | Seol | H04L 9/0869 |
| | | | 708/250 |
| 2017/0235939 A1* | 8/2017 | Caporale | H04L 63/0876 |
| | | | 726/2 |
| 2018/0241564 A1* | 8/2018 | Peterson | A61N 1/37254 |
| 2019/0036690 A1 | 1/2019 | Choi et al. | |
| 2021/0014705 A1* | 1/2021 | Zhou | H04L 5/0053 |

FOREIGN PATENT DOCUMENTS

| | | |
|---|---|---|
| KR | 10-1169172 B1 | 8/2012 |
| KR | 2015-0028540 A | 3/2015 |
| KR | 2017-0087048 A | 7/2017 |

* cited by examiner

Random conducting signal filter

Random position signal filter

Mixed random signal filter

DEVICE FOR GENERATING DIGITAL RANDOM ENCRYPTION KEY

CROSS REFERENCE TO RELATED APPLICATIONS

This application claims priority to and the benefit of Korean Patent Application No. 10-2021-0085678 filed in the Korean Intellectual Property Office on Jun. 30, 2021, the entire contents of which are incorporated herein by reference.

BACKGROUND

(a) Field

The present disclosure relates to a device for generating a digital random encryption key.

(b) Description of the Related Art

Recently, developments of smart mobility devices having various types of connectivity are activated in the field of means of transportation such as vehicles as well as mobile devices, and hence, use convenience for users increases, but stability of security may be vulnerable because of the various connections.

An active element or a passive element may be applied to a memory element for generating an encryption key. When the passive element is applied as the memory cell, the encryption key generated by use of the passive element without an additional power source has a merit of high stability. However, a mechanism for generating an identification key of the passive element is fixed, so the encryption key generated by the passive element lacks randomness. A yield of a process for manufacturing a passive element is low, and applicability of parts is low except for a generation of the encryption key.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to generate a digital encryption key for maintaining high stability allowable when a passive element is used, improving robustness of security, allowing regeneration or random generation, and providing various hardware-based uses.

The present disclosure has been made in another effort to provide a robust combined security architecture design by applying a digital encryption key to a smart mobility device.

The issues of the present disclosure to be solved are not limited to those that are mentioned above, and other tasks that are not stated may be clearly understood by a person of ordinary skill in the art An embodiment of the present disclosure provides a device for generating an encryption key including an input unit through which an analog input signal is supplied, an encryption key generator for randomly supplying an analog input signal supplied through a plurality of upper electrodes from by the input unit to a plurality of memory cells and generating a plurality of analog signals, and a converter for converting the signal generated by the encryption key generator into a digital signal and outputting a digital encryption key.

The encryption key generator may include an input layer for transmitting a signal input by the input unit to a remaining portion through at least one input line, a filter layer for randomly passing the analog signal transmitted from the input layer to the memory element layer, and a memory element layer including a memory cell including a non-volatile active element of an entropy source, and adjusting conductivity of the memory cell through a probability of ion tunneling.

The filter layer may be one of a random conducting signal filter in which a conducting filter or a blocking filter is disposed on a position where the memory cell is provided, a random position signal filter in which a conducting filter is disposed on a random position irrespective of a position of the memory cell, and a mixed random signal filter in which a conducting filter or a blocking filter is disposed on a random position irrespective of the position of the memory cell.

The memory element layer may include an ion source layer having ions, an ion tunneling layer for adjusting a probability for the ions to pass through by controlling a thickness, and a signal detecting channel layer for storing and detecting a controlled analog signal by detecting the ions having passed through the ion tunneling layer.

The ion source layer may include at least one of $LiCoO_2$, $LiMn_2O_4$, $Li_3PO_4$, $LiFePO_4$, $LiNi_{1-x-y}Mn_xCO_yO_2$, $LiNiMn_{2-x}O_4$, $V_2O_5$, and a combination thereof.

The filter layer may be disposed on an upper portion of the ion source layer to transmit the analog signal transmitted from the input layer to an ion source layer or block the same.

The filter layer may be disposed on a lower portion of the signal detecting channel layer to transmit or block the signal transmitted to a lower electrode from the signal detecting channel layer.

The converter may include a calculator for measuring resistance or conductivity of the signal detecting channel layer by using a voltage or current value obtained by measuring a signal detected by the signal detecting channel layer through a lower electrode, and an AD converter for outputting a value of a digital encryption key by converting an analog signal of the resistance or conductivity of the signal detecting channel layer measured by the calculator into a digital signal.

The device may further include a storage unit for storing the digital encryption key output by the converter.

According to the present disclosure, the digital encryption key for maintaining high stability allowable when a passive element is used, improving robustness of security by adding the non-volatile active element, allowing regeneration or random generation, and providing various hardware-based uses may be generated.

Further, the robust combined security architecture design is allowable by applying the digital encryption key to the smart mobility device.

The effects of the present disclosure are not limited to those that are mentioned above, and other effects that are not stated will be clearly understood by a person skilled in the art from the following description.

DETAILED DESCRIPTION

Figure 1:
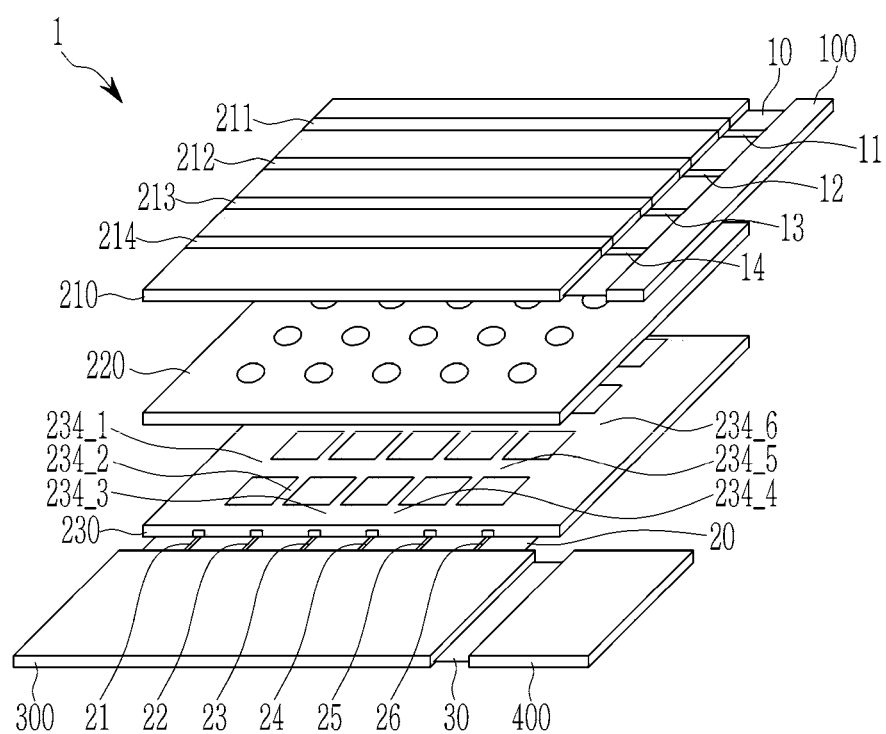
FIG. 1 shows an exploded perspective view of an encryption key generator of a device for generating an encryption key according to an embodiment of the present disclosure.

The present disclosure relates to a hardware-based device for generating an encryption key for a robust combined security architecture design for a smart mobility device.

Hereinafter, embodiments disclosed in the present specification will be described in detail with reference to the accompanying drawings. In the present specification, the same or similar components will be denoted by the same or similar reference numerals, and an overlapped description thereof will be omitted. The terms "module" and "unit" for components used in the following description are used only in order to make the specification easier. Therefore, these terms do not have meanings or roles that distinguish them from each other by themselves. In describing embodiments of the present specification, when it is determined that a detailed description of the well-known art associated with the present disclosure may obscure the gist of the present disclosure, it will be omitted. The accompanying drawings are provided only in order to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various components, and are not interpreted as limiting these components. The terms are only used to differentiate one component from others.

It will be further understood that terms "comprises" or "have" used in the present specification specify the presence of stated features, numerals, steps, operations, components, parts, or a combination thereof, but do not preclude the presence or addition of one or more other features, numerals, steps, operations, components, parts, or a combination thereof.

From among configurations according to an embodiment, a program that is realized with a set of instructions that are an actualized control algorithm for controlling other configurations may be installed in the configuration for controlling the other configurations in a specific control condition. A control configuration may process input data and stored data according to the installed program and may generate output data. The control configuration may include a non-volatile memory for storing a program and a memory for storing data.

FIG. 1 shows an exploded perspective view of an encryption key generator of a device for generating an encryption key according to an embodiment of the present disclosure.

Figure 2:
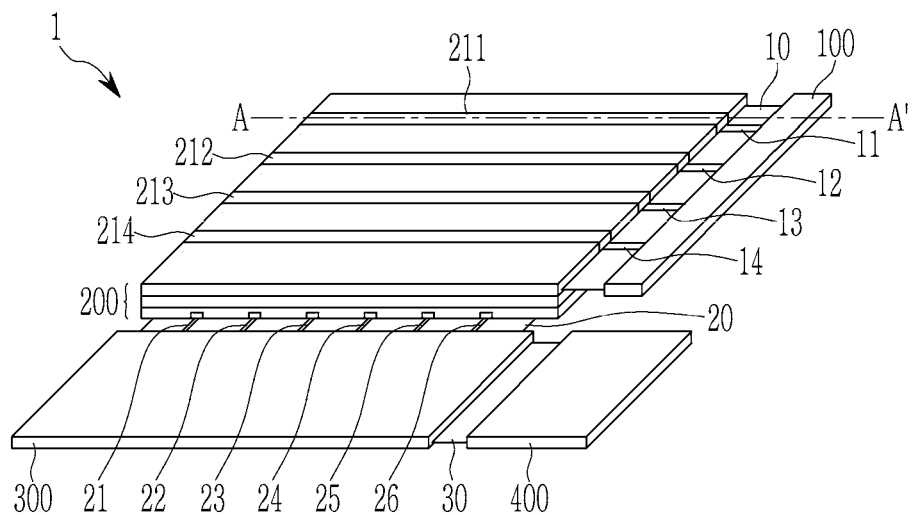
FIG. 2 shows a perspective view of a device for generating an encryption key according to an embodiment of the present disclosure.

FIG. 2 shows a perspective view of a device for generating an encryption key according to an embodiment of the present disclosure.

Referring to FIG. 1 and FIG. 2, the device 1 for generating an encryption key includes an input unit 100, an encryption key generator 200, a converter 300, and a storage unit 400. The encryption key generator 200 includes an input layer 210, a filter layer 220, and a memory element layer 230.

A sequential combination of the disassembled encryption key generator shown in FIG. 1 is shown in FIG. 2.

Here, the input unit 100 inputs an analog voltage signal to the encryption key generator 200. The input unit 100 transmits a voltage signal to the input layer 210 of the encryption key generator 200 through a connection substrate 10. The connection substrate may be bent or warped, for example, it may be a flexible printed circuit board (FPCB).

The encryption key generator 200 randomly supplies analog input signals supplied from the input unit 100 through a plurality of upper electrodes 211 to 214 to a plurality of memory cells and generates a plurality of analog signals.

The encryption key generator 200 is connected to the input unit 100 by the connection substrate 10, and is connected to the converter 300 by a connection substrate 20.

The connection substrate 10 includes a plurality of wires 11 to 14. The connection substrate 20 includes a plurality of wires 21 to 26.

The encryption key generator 200 generates an encryption key from an analog entropy source. The analog entropy source according to an embodiment may be realized with a memory cell. Detailed descriptions will be described in a later portion of the present specification.

The input layer 210 includes a plurality of upper electrodes 211 to 214. The upper electrodes 211 to 214 are electrically connected to the input unit 100 through a plurality of wires 11 to 14. A signal generated by the input unit 100 is transmitted to the upper electrodes 211 to 214 through the wires 11 to 14.

The input unit 100 may sequentially apply analog input signals to the upper electrodes 211 to 214 through the connection substrate 10. In another way, the input unit 100 may simultaneously apply analog input signals to at least two of the upper electrodes 211 to 214 through the connection substrate 10.

A filter layer 220 combined between the input layer 210 and the memory element layer 230 randomly passes the analog signal transmitted from the input layer 210 through the memory element layer 230.

As described, the filter layer 220 is a passive filter and may randomly select a location address in which the input analog signal will be written. The memory element layer 230 includes a plurality of memory cells. The memory element layer 230 includes a plurality of non-volatile memory cells, and adjusts conductivity of the memory cells through a probability of ion tunneling.

The memory element layer 230 includes a plurality of lower electrodes 234_1 to 234_6. The lower electrodes 234_1 to 234_6 are electrically connected to the converter 300 through the wires 21 to 26.

The digital encryption key generated by the converter 300 is stored in the storage unit 400 through the connection substrate 30.

Figure 3:
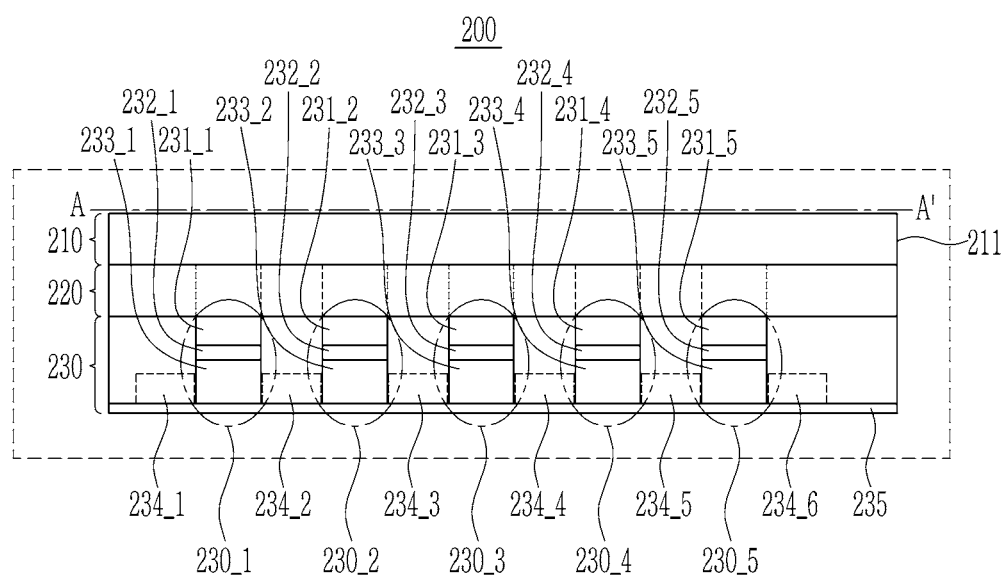
FIG. 3 shows a cross-sectional view with respect to a line A-A' of FIG. 2.

FIG. 3 shows a cross-sectional view with respect to a line A-A' of FIG. 2.

Referring to FIG. 3, the encryption key generator 200 according to an embodiment of the present disclosure includes an input layer 210, a filter layer 220, and a memory element layer 230. The input layer 210 may be positioned on an upper portion, the filter layer 220 may be positioned on a middle portion, and the memory element layer 230 may be positioned on a lower portion in order, and they may be combined.

A stacking structure of the cross-sectional view shown in FIG. 3 may be applied to other regions of the encryption key generator 200.

Regarding describing of the filter layer 220, a conducting filter may indicate a hole for passing signals between the upper and lower portions of the filter layer 220. A blocking filter may conceptually indicate a portion for blocking the signals between the upper and lower portions of the filter layer 220.

The filter layer 220 may include a conducting or blocking filter positioned corresponding to a plurality of memory cells 230_1 to 230_5 of the memory element layer 230. In another way, the filter layer 220 may include a conducting or blocking filter randomly positioned irrespective of locations of a plurality of memory cells 230_1 to 230_5. The conducting filter of the filter layer 220 may be shown to be a via-hole through which signals pass. The filter layer 220 may use a powder randomly arranged mask, and here, the powder randomly arranged mask signifies a filter manufactured by sprinkling powder with a desired size on a thin film, and etching the same in a particle shape of the powder to generate holes in random positions.

The memory element layer 230 includes a plurality of memory cells 230_1 to 230_5, and the memory cells 230_1 to 230_5 respectively include ion source layers 231_1 to 231_5, ion tunneling layers 232_1 to 232_5, and signal detecting channel layers 233_1 to 233_5.

The memory element layer 230 includes a plurality of lower electrodes 234_1 to 234_6 for calculating resistance and/or conductivity of the signal detecting channel layers 233_1 to 233_5.

A plurality of lower electrodes 234_1 to 234_6 are positioned on a substrate 235, and are electrically connected to the signal detecting channel layer (e.g., 233_1) positioned between two adjacent lower electrodes (e.g., 234_1 and 234_2) from among a plurality of lower electrodes 234_1 to 234_6.

Other portions of the memory element layer 230, excluding the memory cells 230_1 to 230_5, the lower electrodes 234_1 to 234_6, and the substrate 235 may be made of insulating layers.

The substrate 235 may be a semiconductor substrate. For example, the substrate 235 may be bulk silicon or a silicon-on-insulator (SOI), and the substrate 235 may be a silicon substrate or may include other materials, for example, silicon germanium, indium antimonide, a lead telluride compound, indium arsenic, indium phosphide, gallium arsenic, or gallium antimonide. In another way, the substrate 235 may be generated by forming an epitaxial layer on a base substrate.

An arrangement of the memory cells 230_1 to 230_5 may be expressed as an analog entropy source arrangement. The analog entropy source arrangement signifies an arrangement for generating a random analog encryption key signal by using the entropy source. The memory cell may be realized with a non-volatile element such as a RRAM, a MRAM, or a PRAM. Regarding the memory cell according to an embodiment, its output characteristic should be randomly controlled, and should not be attacked through reverse engineering analysis. That is, it should have a characteristic in which, when an undesired external input is provided, it will lose its feature.

The ion source layers 231_1 to 231_5 have ions moving to the signal detecting channel layers 233_1 to 233_5 by applying a voltage.

A positive electrode material for the general thin-film battery may be used to the ion source layers 231_1 to 231_5 which may include at least one of $LiCoO_2$, $LiMn_2O_4$, $Li_3PO_4$, $LiFePO_4$, $LiNi_{1-x-y}Mn_xCO_yO_2$, $LiNiMn_{2-x}O_4$, $V_2O_5$, and a combination thereof, and are not limited thereto.

Regarding the ion tunneling layers 232_1 to 232_5, an injection amount of ions may be adjusted by controlling the tunneling layer, such as a thickness, and the randomness of the analog signal may be controlled by the adjustment.

The ion tunneling layers 232_1 to 232_5 may include at least one of $Al_2O_3$, $ZrO_2$, $TiO_2$, $B_2O_3$, $MoO_3$, $WO_3$, and a combination thereof, and are not limited thereto.

An ion tunneling probability of the ion tunneling layers 232_1 to 232_5 may be controlled by the change of the thickness of the ion tunneling layer or the size of the voltage applied to the upper electrodes 211 to 214. For example, when the thickness of the ion tunneling layer increases, the ion tunneling probability may also increase.

The signal detecting channel layers 233_1 to 233_5 store and detect the controlled analog signal, and may include non-volatile active elements.

A material for the resistive random access memory (RRAM) may be used to the signal detecting channel layers 233_1 to 233_5 and it may include at least one of $TiO_x$, $ZnO_x$, $HfO_x$, $TaO_x$, $Wo_x$, and a combination thereof, and is not limited thereto.

The arrangement of the memory cells 230_1 to 230_5 may be manufactured by a thin-film process. The ion source layers 231_1 to 231_5 may be manufactured by using the material that may be made into a thin film from among the materials for the battery. The entropy characteristic of the device 1 for generating an encryption key may be improved by improving a random degree by controlling the ions for changing conductivity of the signal detecting channel layers 233_1 to 233_5 through the ion source layers 231_1 to 231_5.

The non-volatility of the analog entropy source may be improved by suppressing a phenomenon in which the ions injected into the signal detecting channel layers 233_1 to 233_5 return to the ion source layers 231_1 to 231_5 by inserting the ion tunneling layers 232_1 to 232_5.

Regarding the analog entropy source arrangement including the ion source layers 231_1 to 231_5, the ion tunneling layers 232_1 to 232_5, and the signal detecting channel layers 233_1 to 233_5 may be used to generate random information, the difficulty of controlling distribution pointed out as the problem of the existing development of the RRAM may be overcome by generating random information.

Figure 4A:
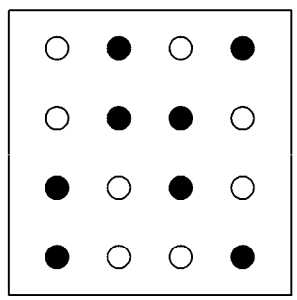
FIGS. 4A, 4B, and 4C show exemplary diagrams of a filter layer of a device for generating an encryption key according to an embodiment of the present disclosure.
Figure 4B:
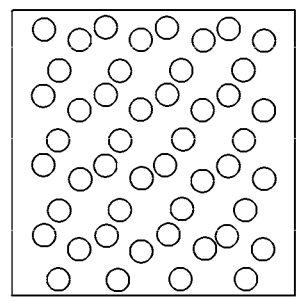
Figure 4C:
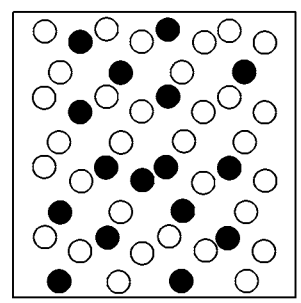

FIGS. 4A-4C show exemplary diagrams of a filter layer of a device for generating an encryption key according to an embodiment of the present disclosure.

Referring to FIG. 4, the filter layer 220 may be one of a random conducting signal filter in which a conducting filter or a blocking filter is positioned on locations where the memory cells 230_1 to 230_5 are provided, a random position signal filter in which a conducting filter is positioned on a random location, and a mixed random signal filter in which a conducting filter or a blocking filter is positioned on a random location.

Referring to FIG. 4, circles indicating "Signal transmission" are holes for passing signals between the upper and lower portions, and the circles may be referred to as conducting filters.

Referring to FIG. 4A, the random conducting signal filter may randomly transmit signals or block the signals on the location of the memory cells 230_1 to 230_5.

Referring to FIG. 4B, the random position signal filter may transmit signals on random locations irrespective of the positions of the memory cells 230_1 to 230_5.

Referring to FIG. 4C, the mixed random signal filter may randomly transmit signals or block the signals on the random location irrespective of the positions of the memory cells 230_1 to 230_5.

Referring to FIG. 4, regarding the filter layer 220, the conducting filter passes the signals transmitted from the upper electrodes 211 to 214 on an overlapping portion from among the memory cells 230_1 to 230_5.

The encryption key generator 200 shown in FIG. 3 is an example when the random conducting signal filter shown in FIG. 4A is applied.

Therefore, the filter layer 220 according to the present disclosure randomizes validity of the analog input signals applied through the upper electrodes 211 to 214. Regarding the analog input signals having passed through the filter layer 220, the ions of the ion source layers 231_1 to 231_5 pass through the ion tunneling layers 232_1 to 232_5 in a probabilistic way, and resistance and/or conductivity of the signal detecting channel layers 233_1 to 233_5 is changed by the tunneled ions.

The converter 300 may calculate the resistance and/or conductivity of the changed signal detecting channel layers 233_1 to 233_5 by a measured current and/or a deduced voltage through the lower electrodes 234_1 to 234_6 positioned on respective sides of the signal detecting channel layers 233_1 to 233_5.

The converter 300 measures currents or deduces voltages of the signal detecting channel layers 233_1 to 233_5 through the lower electrodes 234_1 to 234_6.

The analog input signal supplied from the input unit 100 passes through the encryption key generator 200 and then through the lower electrodes 234_1 to 234_6, and is measured or deduced by the converter 300. The measured or deduced signal is analog-digital converted by the converter 300, and the converter 300 generates a digital encryption key.

Figure 5:
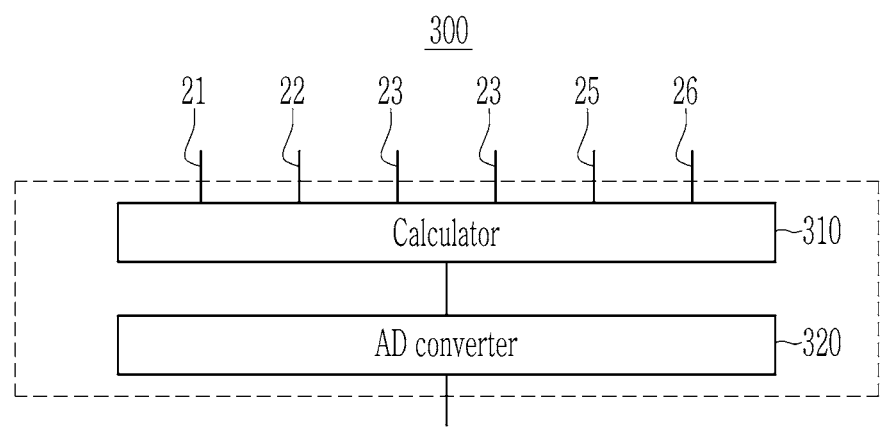
FIG. 5 shows a block diagram of a converter of a device for generating an encryption key according to an embodiment of the present disclosure.

FIG. 5 shows a block diagram of a converter of a device for generating an encryption key according to an embodiment of the present disclosure.

The converter 300 converts the signal generated by the encryption key generator 200 into a digital signal, and outputs the same.

Here, the converter 300 converts the signal transmitted from the encryption key generator 200 through the connection substrate 20 into a digital signal, and generates a digital encryption key.

Referring to FIG. 5, the converter 300 includes a calculator 310 and an AD converter 320, and a plurality of wires 21 to 26 connected to the calculator 310 are connected to the lower electrodes 234_1 to 234_6. The calculator 310 may measure voltages of the lower electrodes 234_1 to 234_6 through the wires 21 to 26, may calculate a voltage difference between the two adjacent electrodes from among the lower electrodes 234_1 to 234_6, and may deduce the voltages of the signal detecting channel layers 233_1 to 233_5. The calculator 310 may measure the currents flowing to the signal detecting channel layers 233_1 to 233_5 by measuring the current between the two adjacent lower electrodes from among the lower electrodes 234_1 to 234_6. The calculator 310 may generate an analog signal indicating resistance and/or conductivity of the signal detecting channel layers 233_1 to 233_5 by using the deduced voltages and the measured current values of the signal detecting channel layers 233_1 to 233_5. The AD converter 320 converts the analog signal generated by the calculator 310 into a digital signal and outputs a value of the digital encryption key.

For example, the calculator 310 measures respective voltages of two lower electrodes (234_1 and 234_2 of FIG. 3) positioned on respective sides of the signal detecting channel layer (233_1 of FIG. 3), and calculates a voltage difference therebetween to deduce the voltage of the signal detecting channel layer (233_1 of FIG. 3). The calculator 310 measures the current between the two lower electrodes (234_1 and 234_2 of FIG. 3) to measure the current flowing to the signal detecting channel layer (233_1 of FIG. 3). The calculator 310 may calculate resistance and/or conductivity based on the current and/or voltage value of the signal detecting channel layer (233_1 of FIG. 3), and may generate an analog signal indicating the calculated value. The resistance and/or conductivity may be different for the respective memory cells 230_1 to 230_5, that is, the arrangement of analog entropy sources.

A method for driving the encryption key generator 200 including a plurality of input lines and a plurality of output lines will now be described with reference to FIG. 6.

Figure 6A:
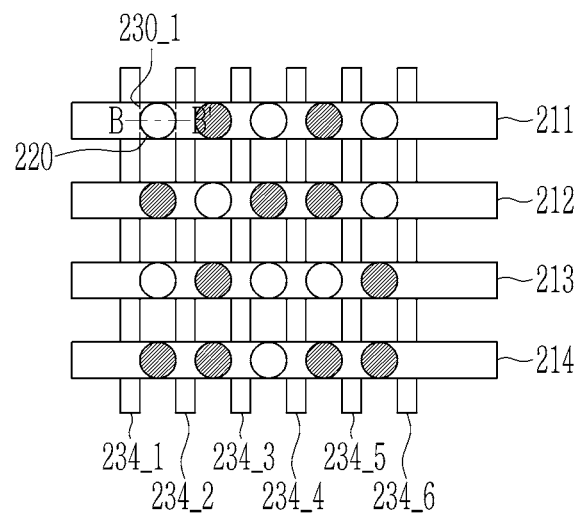
FIGS. 6A and 6B show exemplary diagrams for a driving of an encryption key generator.

FIG. 6A shows an exemplary diagram for a driving of an encryption key generator 200.

Referring to FIG. 6A, a case of including four upper electrodes 211 to 214 and six lower electrodes 234_1 to 234_6 will be exemplified.

Figure 6B:
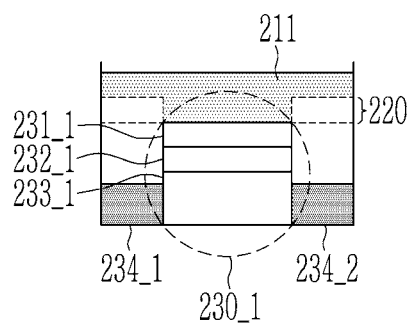

FIG. 6B shows a cross-sectional view with respect to a line B-B' of FIG. 6A.

The memory cell 230_1 shown in FIG. 6B has a 20-bit arrangement ([1,1]:[4,5]) of a 4*5 matrix defined by the arrangement of horizontal upper electrodes 211 to 214 and perpendicular lower electrodes 234_1 to 234_6 shown in FIG. 6A.

According to the example, regarding the memory cell 230_1 at the position [1,1], when a fixed value of voltage is applied to the upper electrode 211, the conducting filter is applied on the filter layer 220, the voltage is applied to the ion tunneling layer 232_1, the ions of the ion source layer 231_1 pass through the ion tunneling layer 232_1 in a probabilistic way, and conductivity of the signal detecting channel layer 233_1 is changed by the tunneled ions. In this instance, the calculator 310 measures the respective voltages at the two lower electrodes 234_1 and 234_2 positioned on the respective sides of the memory cell, or measures the current flowing between the two lower electrodes 234_1 and 234_2 to measure the voltage and/or the current of the signal detecting channel layer 233_1 of the memory cell 230_1 at [1,1].

A stacking structure of the cross-sectional view shown in FIG. 6B may be applied to another memory cell to which the conducting filter is applied on the filter layer 220.

The calculator 310 calculates the resistance and/or conductivity through the voltages and/or the currents measured for respective memory cells through the lower electrodes 234_1 to 234_6. The AD converter 320 receives the analog signal indicating such resistance and/or conductivity from the calculator 310, converts the same into a digital signal, and outputs a digital encryption key of 0's and 1's.

The calculator 310 may be combined with the lower electrodes 234_1 to 234_6 or may be provided to be separated from the same.

The AD converter 320 sets a reference to a discriminant value of the analog signal transmitted from the calculator 310 to finally output the value of the digital encryption key.

Information of the final encryption key may not be obtained because of randomness of the memory cell and randomness of the process, and it may not be reproduced.

The AD converter 320 can be implemented by any algorithm for digitalizing the signal passed through the memory cell to be 0's or 1's, but the algorithm for digitalizing only with 0's or only with 1's is excluded.

According to an embodiment, the filter layer 220 may be positioned on the upper portions of the ion source layers 231_1 to 231_5 to transmit or block the voltages applied by the upper electrodes 211 to 214. In another way, the filter layer 220 may be positioned on the lower portions of the signal detecting channel layers 233_1 to 233_5 to allow or block the transmission of the analog signal to the lower electrode from the signal detecting channel layers 233_1 to 234_5.

Referring to FIG. 3 to FIG. 6, it has been described in the present specification that the filter layer 220 is positioned on the upper portions of the ion source layers 231_1 to 231_5. The above-noted embodiment may be similarly applied to the case in which the filter layer 220 is positioned on the lower portions of the signal detecting channel layers 233_1 to 233_5.

Figure 7:
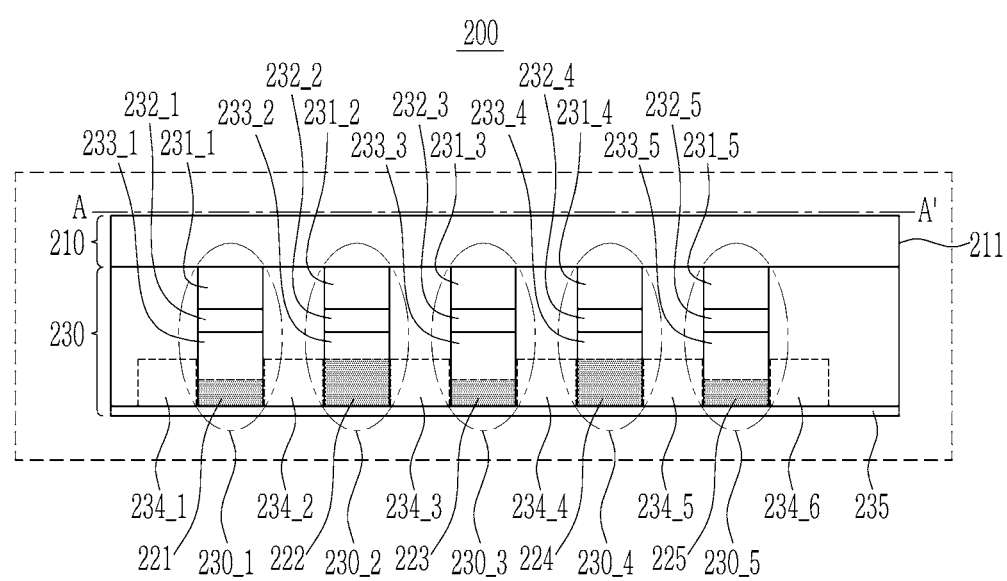
FIG. 7 shows an exemplary diagram for an encryption key generator when a filter layer is positioned on a lower portion of signal detecting channel layers.

FIG. 7 shows an exemplary diagram for an encryption key generator 200 when a filter layer 220 is positioned on a lower portion of signal detecting channel layers 233_1 to 233_5.

Referring to FIG. 7, the filter layer 220 may transmit or block the signal transmitted to the lower electrode from the signal detecting channel layers 233_1 to 233_5.

The filter layer 220 may include lower filters 221, 223, and 225 for transmitting signals and lower filters 222 and 224 for blocking signals.

The memory cell (e.g., 230_2) to which the lower filter (e.g., 222) for blocking signals is applied blocks the signal transmitted from the signal detecting channel layer (e.g., 233_2).

The device for generating an encryption key according to an embodiment of the present disclosure may be used in the smart mobility and may be used as a device for reinforcing security.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

The invention claimed is:

1. A device for generating an encryption key, comprising:
   an input unit through which an analog input signal is supplied;
   an encryption key generator for randomly supplying an analog input signal through a plurality of upper electrodes from by the input unit to a plurality of memory cells, and generating a plurality of analog signals; and
   a converter for converting the signal generated by the encryption key generator into a digital signal and outputting a digital encryption key;
   wherein the encryption key generator includes:
   an input layer for transmitting a signal input by the input unit to a remaining portion through at least one input line;
   a filter layer for randomly passing the analog signal transmitted from the input layer to the memory element layer; and
   a memory element layer including a memory cell having a non-volatile active element of an entropy source, and adjusting conductivity of the memory cell through a probability of ion tunneling.

2. The device of claim 1, wherein the filter layer is one of:
   a random conducting signal filter in which a conducting filter or a blocking filter is disposed on a position where the memory cell is provided;
   a random position signal filter in which a conducting filter is disposed on a random position irrespective of a position of the memory cell; and
   a mixed random signal filter in which a conducting filter or a blocking filter is disposed on a random position irrespective of the position of the memory cell.

3. The device of claim 1, wherein the memory element layer includes:
   an ion source layer having ions;
   an ion tunneling layer for adjusting a probability for the ions to pass through by controlling a thickness; and
   a signal detecting channel layer for storing and detecting a controlled analog signal by detecting the ions having passed through the ion tunneling layer.

4. The device of claim 3, wherein the ion source layer includes at least one of $LiCoO_2$, $LiMn_2O_4$, $Li_3PO_4$, $LiFePO_4$, $LiNi_{1-x-y}Mn_xCO_yO_2$, $LiNiMn_{2-x}O_4$, $V_2O_5$, and a combination thereof.

5. The device of claim 3, wherein the filter layer is disposed on an upper portion of the ion source layer to transmit the analog signal transmitted from the input layer to an ion source layer or to block the analog signal.

6. The device of claim 3, wherein the filter layer is disposed on a lower portion of the signal detecting channel layer to transmit or block the signal transmitted to a lower electrode from the signal detecting channel layer.

7. The device of claim 3, wherein the converter includes:
   a calculator for measuring resistance or conductivity of the signal detecting channel layer by using a voltage or current value obtained by measuring a signal detected by the signal detecting channel layer through a lower electrode; and
   an AD converter for outputting a value of a digital encryption key by converting an analog signal of the resistance or conductivity of the signal detecting channel layer measured by the calculator into a digital signal.

8. The device of claim 1, further comprising a storage unit for storing the digital encryption key output by the converter.

\* \* \* \* \*